(12) United States Patent
Shimizu et al.

(10) Patent No.: US 11,272,671 B2
(45) Date of Patent: Mar. 15, 2022

(54) RECIPROCATING BLADE APPARATUS AND HANDHELD WORKING MACHINE

(71) Applicant: YAMABIKO CORPORATION, Tokyo (JP)

(72) Inventors: Kunio Shimizu, Tokyo (JP); Hisao Kodama, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 104 days.

(21) Appl. No.: 16/936,770

(22) Filed: Jul. 23, 2020

(65) Prior Publication Data

US 2021/0029887 A1  Feb. 4, 2021

(30) Foreign Application Priority Data

Aug. 2, 2019  (JP) .............................. JP2019-143061

(51) Int. Cl.
*A01G 3/053* (2006.01)
*A01G 3/04* (2006.01)
*A01D 34/17* (2006.01)

(52) U.S. Cl.
CPC ........... *A01G 3/053* (2013.01); *A01G 3/0435* (2013.01); *A01D 34/17* (2013.01); *A01G 2003/0461* (2013.01)

(58) Field of Classification Search
CPC ...... A01D 34/135; A01D 34/30; A01D 34/10; A01D 34/17; A01G 3/067; A01G 3/053; A01G 3/0435; A01G 2003/0461
See application file for complete search history.

(56) References Cited

U.S. PATENT DOCUMENTS

| | | | | | |
|---|---|---|---|---|---|
| 2,277,080 | A | * | 3/1942 | Davis ..................... | A01G 3/053 30/124 |
| 2,281,189 | A | * | 4/1942 | Wright ................... | A01G 3/053 30/132 |
| 2,284,196 | A | * | 5/1942 | Gramps ................. | A01G 3/047 30/198 |
| 2,509,564 | A | * | 5/1950 | Hall ....................... | A01G 3/053 30/216 |
| 2,594,961 | A | * | 4/1952 | Maylen .................. | A01G 3/047 30/211 |

(Continued)

FOREIGN PATENT DOCUMENTS

| | | |
|---|---|---|
| JP | 2008-136370 A | 6/2008 |
| JP | 2016-49082 A | 4/2016 |
| JP | 2016049082 A | 4/2016 |

OTHER PUBLICATIONS

European Extended Search Report issued in corresponding International Appln No. 20188502.7 dated Dec. 22, 2020.

*Primary Examiner* — Sean M Michalski
(74) *Attorney, Agent, or Firm* — Bacon & Thomas, PLLC

(57) ABSTRACT

A reciprocating blade apparatus includes a pair of reciprocating blades stacked on one another in a thickness direction, and a transmission case including a power train configured to reciprocate the pair of reciprocating blades. The power train includes a pair of eccentric cams, and a pair of reciprocating members including fitting holes in which the eccentric cams are fitted, respectively. The pair of reciprocating members is guided to be able to move along an axis line which is parallel to a moving direction of the pair of reciprocating blades and runs through a rotation axis of the eccentric cams.

6 Claims, 5 Drawing Sheets

(56) References Cited

U.S. PATENT DOCUMENTS

| | | | | |
|---|---|---|---|---|
| 2,630,628 | A * | 3/1953 | Hall | A01G 3/053 30/216 |
| 3,897,630 | A * | 8/1975 | Glover | A01G 3/053 30/220 |
| 4,023,334 | A * | 5/1977 | Heath | A01D 34/135 56/297 |
| 4,679,322 | A * | 7/1987 | Hunts | B26B 19/44 30/133 |
| 5,581,891 | A * | 12/1996 | Wheeler | A01G 3/053 30/216 |
| 6,598,299 | B2 * | 7/2003 | Stark | A01G 3/053 30/216 |
| 7,757,405 | B2 * | 7/2010 | Peterson | A01G 3/053 30/220 |
| 9,603,311 | B2 * | 3/2017 | Wang | A01G 3/053 |
| 10,321,636 | B2 * | 6/2019 | Peterson | A01G 3/053 |
| 10,721,862 | B2 * | 7/2020 | Bich | A01D 34/145 |
| 2020/0404857 | A1 * | 12/2020 | Shimizu | A01G 3/047 |
| 2021/0029887 | A1 * | 2/2021 | Shimizu | A01G 3/053 |
| 2021/0100170 | A1 * | 4/2021 | Suzuki | B25F 5/026 |

\* cited by examiner

RECIPROCATING BLADE APPARATUS AND HANDHELD WORKING MACHINE

CROSS-REFERENCE TO RELATED APPLICATIONS

The present application claims priority from Japanese Patent Application No. 2019-143061 filed on Aug. 2, 2019, and the entire contents of which are hereby incorporated by reference.

BACKGROUND

1. Technical Field

The present invention relates to a reciprocating blade apparatus, and a handheld working machine equipped with the reciprocating blade apparatus.

2. Related Art

As a handheld working machine for cutting or clipping branches and leaves, there has been generally known a hedge trimmer equipped with a reciprocating blade apparatus having reciprocating blades, like a hair clipper, as disclosed, for example, in Japanese Unexamined Patent Application Publication No. 2008-136370.

Here, the reciprocating blade has an advantage over a rotary blade or a nylon cutter used in a common brush cutter in that it produces little scattering substances during the work. With this advantage of the reciprocating blade, a brush cutter for cutting grass on the ground has been proposed, for example, in Japanese Unexamined Patent Application Publication No. 2016-49082, which includes a reciprocating blade apparatus mounted to the top end of a handheld operating rod.

With the above-described related art, the power is transmitted to a gearing system in the transmission case via the drive shaft, and the reciprocating blades are coupled to a crank arm of the gearing system. The gearing system transmits the power from the drive shaft to a transmission shaft pivotally supported in the transmission case to rotate the transmission shaft. This rotation of the transmission shaft allows a crank arm coupled to a crank to rotate about an eccentric axis to swing the top end of the crank arm about a fixed axis. By this means, the reciprocating blades coupled to the top end of the crank arm are reciprocated for the swing width.

The gearing system according to the above-described related art has a structure where the top end of the crank arm is moved also in a direction intersecting the moving direction of the reciprocating blades due to the arc motion of the top end of the crank arm, and the movement is cleared by the connecting part of the top end of the crank arm and the blades. Accordingly, vibrations in a direction different from the reciprocating motion of the blades are applied to the blades. This prevents the blades from smoothly reciprocating, and consequently, tends to cause a problem with vibrations and noise.

SUMMARY

To solve the above-described problem, it is desirable to provide a reciprocating blade apparatus capable of smoothly reciprocating the blades of the reciprocating blade apparatus, and preventing the vibrations and noise of the brush cutter equipped with the reciprocating blade apparatus.

An aspect of the present invention provides a reciprocating blade apparatus including: a pair of reciprocating blades stacked on one another in a thickness direction, and a transmission case including a power train configured to reciprocate the pair of reciprocating blades. The power train includes a pair of eccentric cams, and a pair of reciprocating members including fitting holes in which the eccentric cams are fitted, respectively. The pair of reciprocating members is guided to be able to move along an axis line which is parallel to a moving direction of the pair of reciprocating blades and runs through a rotation axis of the eccentric cams.

According to the present invention, the joint members of the power train are guided to be able to move along the axis line which is parallel to the moving direction of the reciprocating blades and runs through the rotation axis of the eccentric cams. Therefore, it is possible to smoothly reciprocate the blades of the reciprocating blade apparatus, and prevent the vibrations and noise of the brush cutter equipped with the reciprocating blade apparatus.

DETAILED DESCRIPTION

Hereinafter, an embodiment of the present invention will be described with reference to the drawings. The same reference numbers in the different drawings indicate the same functional parts, and therefore repeated description for each of the drawings is omitted.

Figure 1:
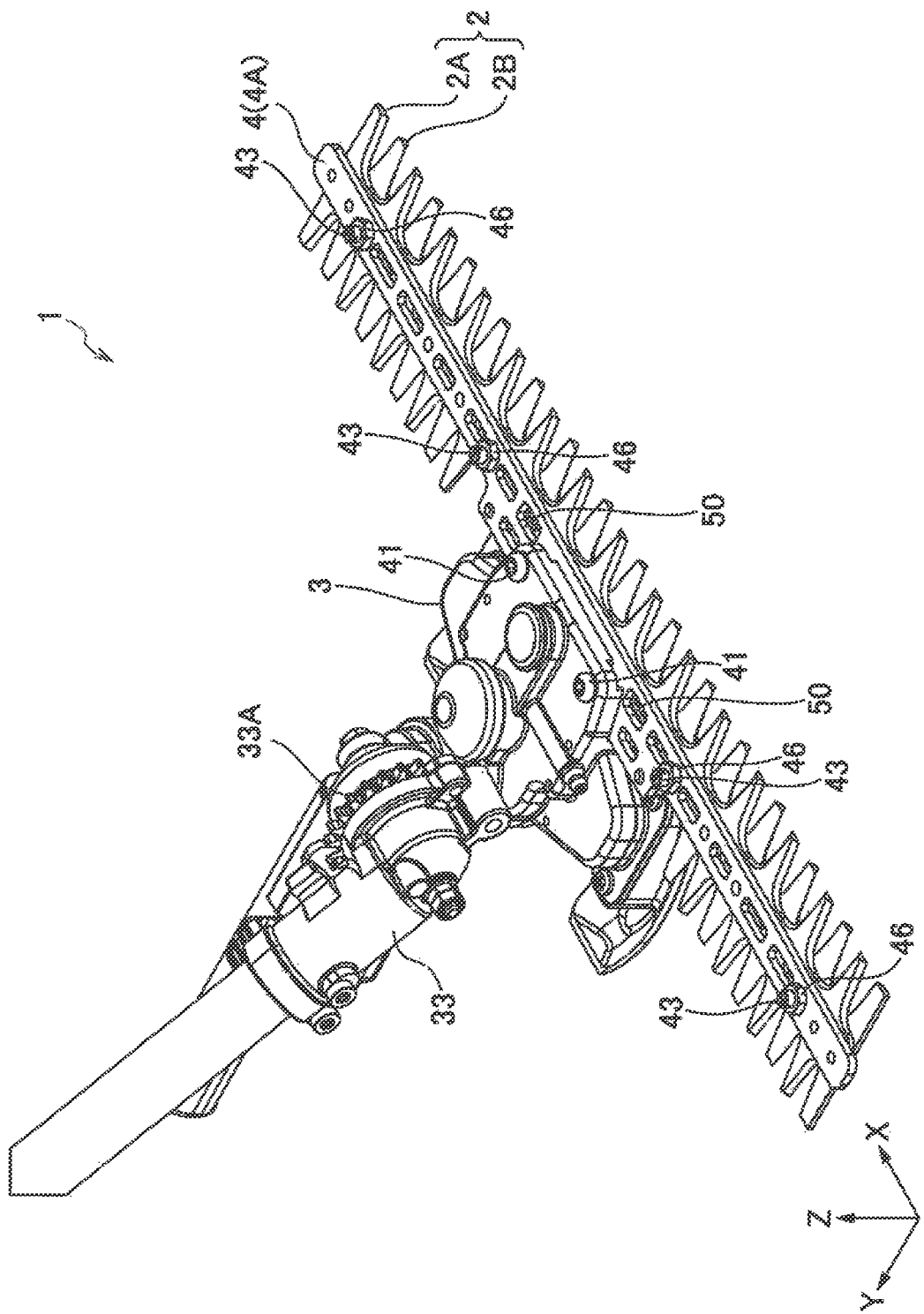
FIG. 1 is a perspective view illustrating the external appearance of a reciprocating blade apparatus according to an embodiment of the present invention.
Figure 2:
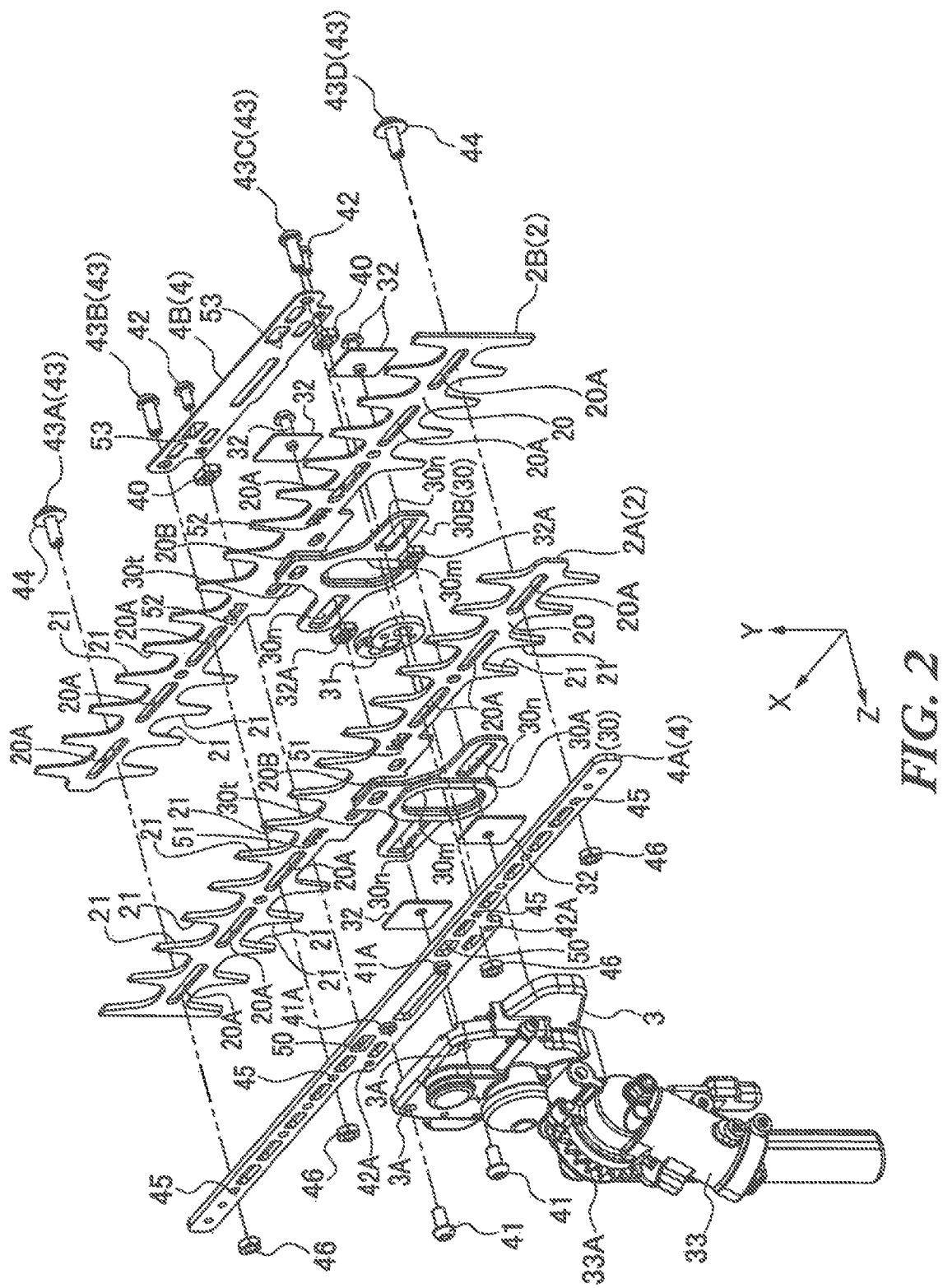
FIG. 2 is an exploded perspective view illustrating the reciprocating blade apparatus according to an embodiment of the present invention.

As illustrated in FIGS. 1 and 2, a reciprocating blade apparatus 1 includes a pair of reciprocating blades 2 (hereinafter referred to as "blade member"), a transmission case 3, and a blade support member 4. The reciprocating blade apparatus 1 is configured to cut and mow plants and so forth by sliding and reciprocating the blade member 2 relative to one another.

The blade member 2 includes two blades 2A and 2B made of metal plates which are stacked in the thickness direction (Z direction in the drawings). Each of the blades 2A and 2B of the blade member 2 includes a base 20 as a flat plate extending in the longitudinal direction (X direction in the drawings) and a plurality of teeth 21 protruding in the direction (Y direction in the drawings) intersecting the longitudinal direction.

The base 20 of each of the blades 2A and 2B is supported by the blade support member 4, and includes a plurality of long holes 20A formed along the longitudinal direction (X direction in the drawings) of the blade member 2. Adjustment screws described later as fastening members penetrate the long holes 20A. These long holes 20A regulate the moving direction of the blade member 2 reciprocating.

The teeth 21 may be provided in both sides of each of the blades 2A and 2B in Y direction as illustrated, or provided in one side. These teeth 21 are like comb-like blades of a hair clipper. The two blades 2A and 2B slide relative to one another in the longitudinal direction to cut the plants between the teeth 21 of the blades 2A and 2B.

The transmission case 3A includes a power train to reciprocate the blade member 2. The power train is configured to convert the rotation of a drive shaft (not illustrated) to reciprocating motion, and includes reciprocating members 30 (30A and 30B) such as connecting rods which are reciprocably supported in the longitudinal direction (X direction in the drawings) of the blade member 2, and a pair of eccentric cams 31.

Figure 3:
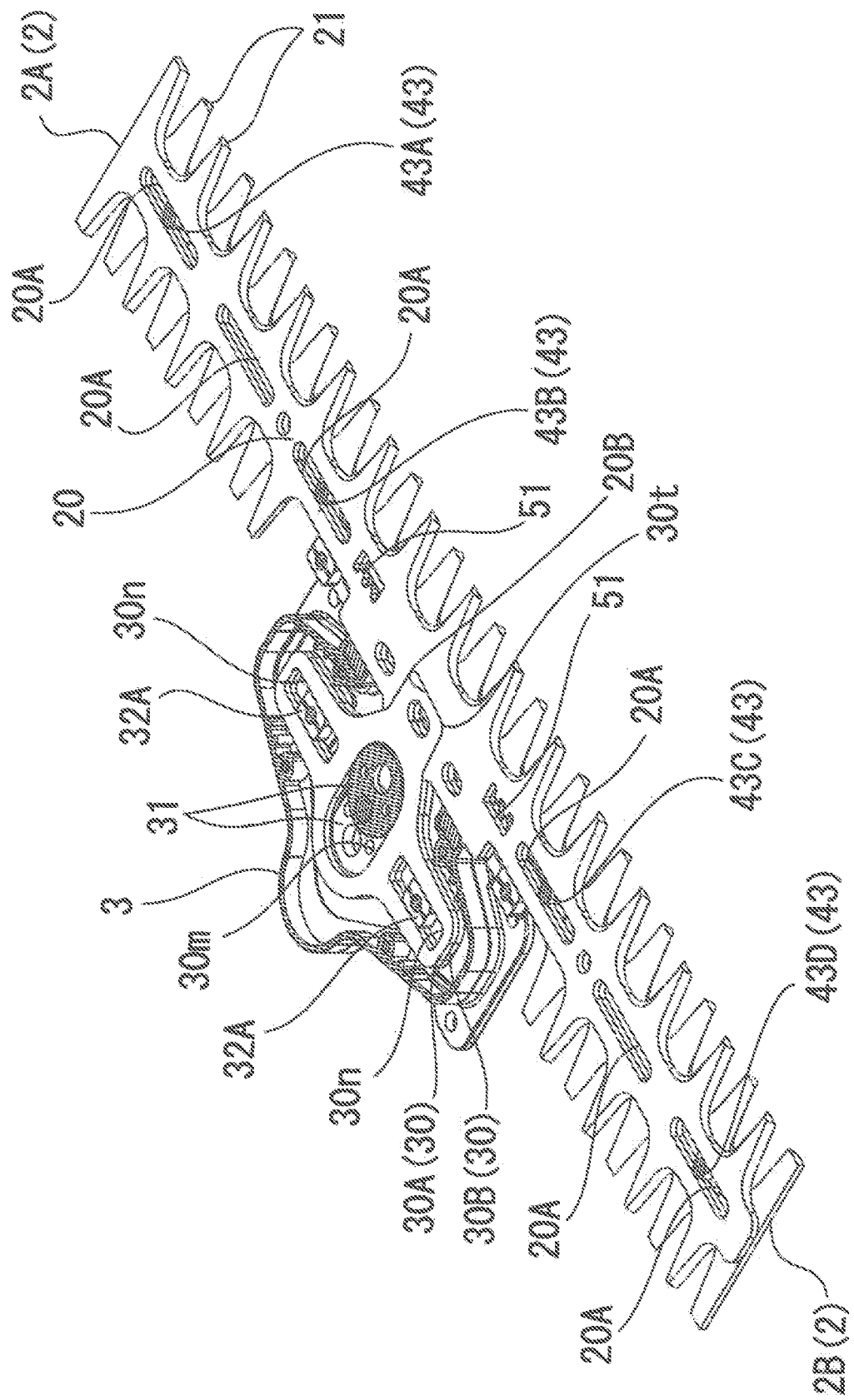
FIG. 3 is a perspective view illustrating a power train in a transmission case.
Figure 4:
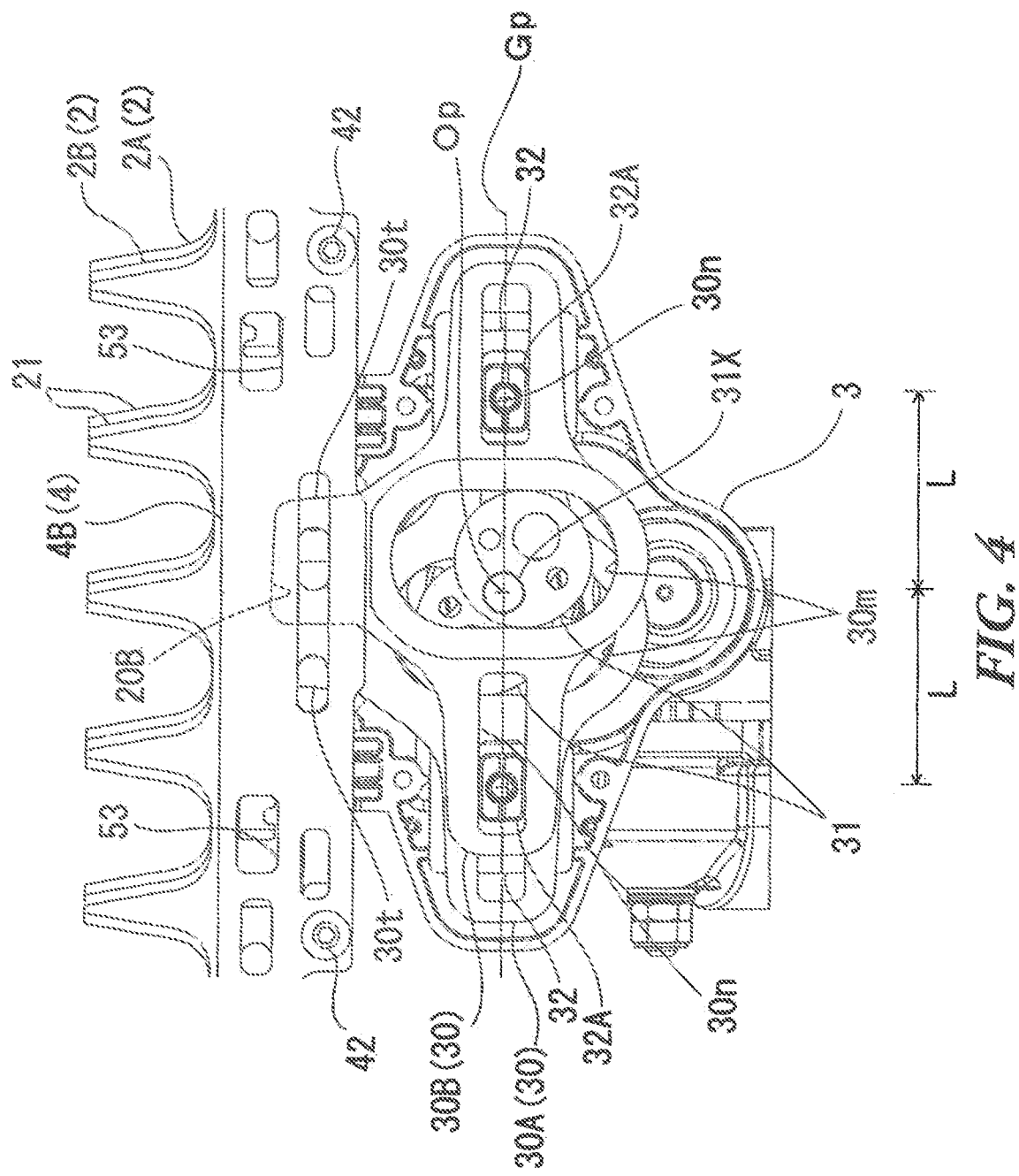
FIG. 4 is a plan view illustrating the power train in the transmission case.

As illustrated in FIGS. 3 and 4, the reciprocating members 30 (30A and 30B) include joints 30t formed at their top ends which are coupled to the bases 20 of the blades 2A and 2B, respectively. Each of the joints 30t includes a convex portion protruding in the direction (Y direction in the drawings) orthogonal to the longitudinal direction of the blade member 2. Meanwhile, a concave portion 20B is formed in the base 20 to engage with the convex portion of the joint 30t.

Each of the reciprocating members 30 (30A, 30B) includes a fitting hole 30m in which the eccentric cams 31 are fitted, and guide holes 30n. Guide members 32A are fixed to the transmission case 3 via support members 32, and engaged with the guide holes 30n of the reciprocating members 30. The guide holes 30n are provided on the right and left sides of the fitting hole 30m along X direction in FIG. 2.

The blade support member 4 is attached to the transmission case 3, and sandwiches the bases 20 of the pair of blades 2A and 2B therebetween to allow the blade member 2 to move in the longitudinal direction (X direction in the drawings). As illustrated in FIG. 2, the blade support member 4 includes a pair of support plates (upper support plate 4A and lower support plate 4B) extending in the longitudinal direction (X direction) of the blade member 2.

The upper support plate 4A and the lower support plate 4B of the blade support member 4 are fastened via spacers 40 to make a space to accommodate the blades member 2. The upper support plate 4A and the lower support plate 4B are individually attached to the transmission case 3 while keeping the space. The blade member 2 is accommodated in the space and detachably attached to the blade support member 4.

Here, how to fasten and support the blade member 2 and the blade support member 4 will be described. First, attachment screws 41 are screwed into screw holes 41A of the upper support plate 4A via holes 3A of the transmission case 3 to independently attach the upper support plate 4A of the blade support member 4 to the transmission case 3. Meanwhile, the upper support plate 4A and the lower support plate 4B are fastened by fastening screws 42 at fastening points 42A without interfering with the blade member 2. The fastening screws 42 penetrate the holes of the lower support plate 4B and the spacers 40, and are screwed into the fastening points 42A of the upper support plate 4A. By this means, the upper support plate 4A and the lower support plate 4B are fastened while keeping the space for the thickness of the spacers 40, and attached to the transmission case 3. In this case, the upper support plate 4A and the lower support plate 4B are coupled to one another by the fastening screws 42 via the spacers 40, and the fastened portion serves as a joint of bamboo. By this means, it is possible to improve the rigidity of the blade member 2 and the blade support member 4 while reducing the weight.

The pair of blades 2A and 2B sandwiched between the upper support plate 4A and the lower support plate 4B is reciprocably supported by the blade support member 4 with the adjustment screws 43 (43A, 43B, 43C and 43D) at points different from the fastening points 42A. Here, the two adjustment screws 43A and 43D of the four adjustment screws 43 are inserted into washers 44 and screwed into screw holes 45 of the upper support plate 4A via the long holes 20A of the blade member 2, and fixed by fixing nuts 46. In addition, the other two adjustment screws 43B and 43C are inserted into the holes of the lower support plate 4B, and screwed into the screw holes 45 of the upper support plate 4A via the long holes 20A of the blade member 2, and fixed by the fixing nuts 46.

In this case, the distance between the washer 44 and the upper support plate 4A is adjusted by the adjustment screws 43A and 43D, and therefore it is possible to adjust the distance between the two blades 2A and 2B sandwiched between the washer 44 and the upper support plate 4A. In addition, the distance between the upper support plate 4A and the lower support plate 4B is adjusted by the adjustment screws 43B and 43D, and therefore it is possible to adjust the distance between the two blades 2A and 2B sandwiched between the upper support plate 4A and the lower support plate 4B.

As illustrated in FIGS. 3 and 4, the blade member 2 is coupled to the power train in the transmission case 3 simply by coupling the joints 30t of the reciprocating members 30 to the bases 20 of the blade member 2, and engaging the convex portions of the joints 30t with the concave portions 20B of the bases 20 caving in the direction in which the convex portions protrude. Therefore, it is possible to easily detach the blade member 2 from the transmission case 3 and the blade support member 4 by pulling out the blade member 2 in Y direction.

Here, in a case where the concave portion 20B is provided near the center of each of the bases 20 in the longitudinal direction, the concave portion 20B can be easily engaged with the convex portion of the joint 30t of the reciprocating member 30 simply by aligning approximately the center of the base 20 with approximately the center of the blade support member 4. By this means, it is possible to readily couple the blade member 2 to the power train. Meanwhile, even in a case where the concave portion 20B is not provided near the center of the base 20, the joint 30t of the reciprocating member 30 can be seen between the upper support plate 4A and the lower support plate 4B, and therefore it is possible to easily engage the joint 30t with the concave portion 20B of the base 20, watching the convex portion of the joint 30t.

In addition, in a case where the blade member 2 is detached from the blade support member 4, when the joint 30t of the reciprocating member 30 engaged with the concave portion 20B of the blade 2A overlaps the joint 30t of the reciprocating member 30 engaged with the concave portion 20B of the blade 2B, it is easy not only to detach the blade member 2 but also to attach the blade member 2. However, when the blades 2A and 2B are stopped during the reciprocating motion of them, the concave portions 20B of the blades 2A and 2B are not aligned with one another, and also the joints 30t are not aligned with one another.

Therefore, alignment holes 50 of the upper support plate 4A, alignment holes 51 of the blade 2A, alignment holes 52 of the blade 2B, and alignment holes 53 of the lower support plate 4B are provided to align the blades 2A and 2B with one another when the blade member 2 is stopped. After the blade member 2 is stopped, the blades 2A and 2B can be aligned with one another by inserting a tool such as a flat-blade screwdriver into the alignment holes 50 to 53, and therefore it is possible to align the concave portions 20B of the blades 2A and 2B with one another before the blade member 2 is detached from the blade support member 4. By this means, it is possible to overlap the joints 30t engaged with the concave portions 20B with one other. This alignment makes it easy to attach and detach the blade member 2 to and from the blade support member 4. In order to check the alignment, a plurality of holes are formed in the upper support plate 4A and the blades 2A and 2B, which overlap with each other when the alignment is successfully done.

In the transmission case 3, the rotation of the drive shaft is transmitted via the gear of the power train to rotate the pair of eccentric cams 31 about a rotation axis 31X. The pair of eccentric cams 31 includes disc bodies rotating together about an eccentric axis with a phase difference of 180 degrees. The eccentric cams 31 are fitted into the fitting holes 30m of the pair of reciprocating members 30A and 30B, respectively.

As illustrated in FIG. 4, the guide holes 30n provided on the both sides of the fitting holes 30m of each of the reciprocating members 30A and 30B extend parallel to the direction in which the blade member 2 reciprocates. In addition, the guide members 32A engaged with the guide holes 30n are provided on an axis line Gp running through a center Op of the rotation axis 31X of the eccentric cams 31, and are spaced the same distance L from the center Op of the rotation axis 31X. By this means, the pair of reciprocating members 30A and 30B is guided to be able to move along the axis line Gp which is parallel to the moving direction of the blade member 2 and runs through the center Op of the rotation axis 31X of the eccentric cams 31.

With this power train, the pair of reciprocating members 30A and 30B coupled to the blade member 2 is guided to linearly move by the pair of guide members 32A which are provided to pass through the center Op of the rotation axis 31X of the eccentric cams 31 and are spaced the same distance L from the center Op of the rotation axis 31X. This makes it possible to apply the reaction force of the guide members 32A and the eccentric cams 31 to the pair of reciprocating members 30A and 30B in a balanced manner, and therefore to allow the blade member 2 to smoothly reciprocate. By this means, it is possible to prevent the vibrations and noise from occurring during the operation of the blade member 2 (2A and 2B).

Moreover, the reciprocating members 30A and 30B include the joints 30t as convex portions protruding in the direction orthogonal to the axis line Gp along which the reciprocating members 30A and 30B are guided, and the joints 30t are engaged with the concave portions 20B formed in the bases 20 of the blade member 2 in the direction orthogonal to the axis line Gp. By this mean's, the motion of the reciprocating members 30A and 30B moving parallel to the axis line Gp efficiently reciprocate the blade members 2. Therefore, it is possible to stably reciprocate the blade member 2 without wobbling. Moreover, it is possible to shorten the distance between the axis line Gp and the bases 20 of the blade member 2, and therefore to efficiently transmit the motion of the reciprocating members 30A and 30B to the blade members 2.

Figure 5:
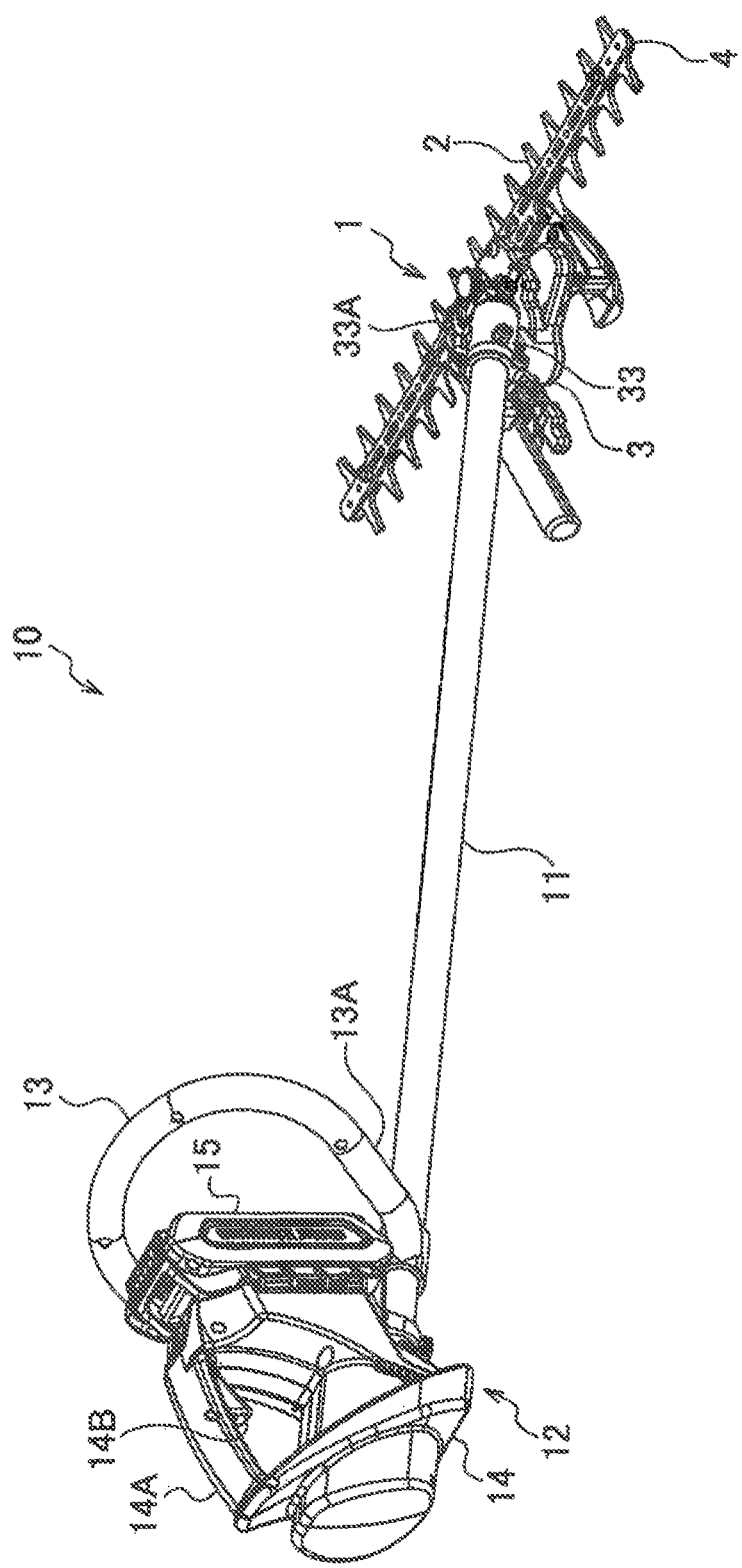
FIG. 5 illustrates a handheld working machine equipped with the reciprocating blade apparatus.

FIG. 5 illustrates an example of handheld working machine including the reciprocating blade apparatus 1. As illustrated in FIG. 5, a handheld working machine 10 includes an operating rod 11, and the top end of the operating rod 11 is mounted to an operating rod mount 33 of the transmission case 3. The operating rod mount 33 is mounted to the transmission case 3 via an angle adjustment mechanism 33A. The angle adjustment mechanism 33A can adjust the rising angle of the operating rod 11 from the working surface of the blade member 2.

A drive shaft (not illustrated) configured to transmit the power to the power train is provided in the operating rod 11. In addition, a drive unit 12 configured to drive the drive shaft is provided at the base end of the operating rod 11, and an operating handle 13 is provided in the base end side of the operating rod 11. The operating handle 13 includes a grip 13A above the operating rod 11.

The drive unit 12 is configured to drive the reciprocating blade apparatus 1 via the drive shaft in the operating rod 11, and includes a housing 14 to accommodate a motor disposed approximately coaxially with the operating rod 11. A rear handle 14A including an operating switch 14B configured to turn on and off the reciprocating blade apparatus 1 is provided in the housing 14. A buttery unit 15 configured to supply electric power to the motor in the housing 14 is externally attached to the housing 14.

This handheld working machine 10 is an electric brush cutter equipped with the reciprocating blade apparatus 1. The longitudinal direction of the blade member 2 intersects the longitudinal direction of the operating rod 11, and therefore the reciprocating blade apparatus 1 is provided at the top end of the operating rod 11 to form a T-shape. This handheld working machine 10 performs brush cutting by driving the reciprocating blade apparatus 1 to move the reciprocating blade apparatus 1 along the ground while the worker holds the operating handle 13 and the rear handle 14A of the housing 14 by the hands to keep a predetermined rising angle of the operating rod 11 from the ground.

With this handheld working machine 10, the width of the blade member 2 of the reciprocating blade apparatus 1 is the effective width, and therefore the worker simply pushes the operating rod 11 without shaking the operating rod 11 from side to side, and consequently it is possible to do the brush cutting with the effective width. Therefore, it is possible to perform the brush cutting by speedily moving the reciprocating blade apparatus 1 forward, and consequently to improve the efficiency of the brush cutting. Moreover, the reciprocating blades are used, and therefore it is possible to reduce the scattering substances during the brush cutting. By this means, it is possible to ensure the safety of the worker and the surrounding of the worker, and prevent the damage of other people's properties near the working site during the brush cutting. Moreover, when the teeth 21 of the blade member 2 are provided on both the front and back sides, it is possible to easily cut plants left uncut by pulling the handheld working machine 10 to the worker.

Furthermore, the handheld working machine 10 allows comfortable work with little vibration and prevents the noise due to the reciprocating motion of the blade member 2. Therefore, it is possible to allow the work without harmful effects on the surrounding of the working site due to the noise.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A reciprocating blade apparatus comprising: a pair of reciprocating blades stacked on one another in a thickness direction; and a transmission case including a power train configured to reciprocate the pair of reciprocating blades, the power train including: a pair of eccentric cams; and a pair of reciprocating members each including a fitting hole in which the eccentric cams are fitted, respectively, wherein the pair of reciprocating members is guided to be able to move along an axis line which is parallel to a moving direction of the pair of reciprocating blades and runs through a rotation axis of the eccentric cams; wherein:

each of the pair of reciprocating members includes a pair of guide holes formed one on each side of a fitting hole; and the transmission case includes a pair of guide members, each engaged with a respective guide holes.

2. The reciprocating blade apparatus according to claim 1, wherein the guide members are spaced a same distance from the rotation axis on the axis line.

3. The reciprocating blade apparatus according claim 1, wherein top ends of the reciprocating members include convex portions removably engaged with concave portions formed in the reciprocating blades.

4. A handheld working machine including a reciprocating blade apparatus, the reciprocating blade apparatus including: a pair of reciprocating blades stacked on one another in a thickness direction; and a transmission case including a power train configured to reciprocate the pair of reciprocating blades, the power train including: a pair of eccentric cams; and a pair of reciprocating members each including a fitting hole in which the eccentric cams are fitted, respectively, wherein the pair of reciprocating members is guided to be able to move along an axis line which is parallel to a moving direction of the pair of reciprocating blades and runs through a rotation axis of the eccentric cams, the handheld working machine comprising: an operating rod having a top end to which the transmission case is mounted; a drive shaft provided in the operating rod and configured to transmit power to the power train; and a drive unit provided at a base end of the operating rod and configured to drive the drive shaft, wherein the longitudinal direction of the pair of reciprocating blades intersects a longitudinal direction of the operating rod; wherein:

each of the pair of reciprocating members includes a pair of guide holes formed one on each side of a fitting hole; and the transmission case includes a pair of guide members, each engaged with a respective guide holes.

5. The handheld working machine according to claim 4, wherein the guide members are spaced a same distance from the rotation axis on the axis line.

6. The handheld working machine according to claim 4, wherein top ends of the reciprocating members include convex portions removably engaged with concave portions formed in the reciprocating blades.

\* \* \* \* \*